US010565940B2

(12) United States Patent
Lee et al.

(10) Patent No.: US 10,565,940 B2
(45) Date of Patent: Feb. 18, 2020

(54) DISPLAY DEVICE HAVING OPTICAL SENSOR

(71) Applicant: LG DISPLAY CO., LTD., Seoul (KR)

(72) Inventors: Joohee Lee, Incheon (KR); Moonsoo Chung, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/842,775

(22) Filed: Dec. 14, 2017

(65) Prior Publication Data

US 2019/0012967 A1 Jan. 10, 2019

(30) Foreign Application Priority Data

Jul. 10, 2017 (KR) ........................ 10-2017-0087310

(51) Int. Cl.

*G06F 3/038* (2013.01)
*G09G 5/00* (2006.01)
*G09G 3/34* (2006.01)
*G09G 3/36* (2006.01)

(52) U.S. Cl.

CPC ......... *G09G 3/3406* (2013.01); *G09G 3/3677* (2013.01); *G09G 3/3688* (2013.01); *G09G 3/3614* (2013.01); *G09G 2300/0426* (2013.01); *G09G 2310/08* (2013.01); *G09G 2320/064* (2013.01); *G09G 2320/0646* (2013.01); *G09G 2360/144* (2013.01)

(58) Field of Classification Search

CPC ............................... G06F 3/0412; G06F 3/042
See application file for complete search history.

(56) References Cited

U.S. PATENT DOCUMENTS

2008/0024414 A1 1/2008 Shih et al.
2008/0158120 A1 7/2008 An et al.
2008/0252618 A1* 10/2008 Chung .................. G02F 1/1368 345/175
2009/0267917 A1 10/2009 Lee et al.
2012/0038585 A1* 2/2012 Kim ...................... G06F 3/0412 345/174
2012/0056835 A1 3/2012 Choo et al.
2012/0091321 A1* 4/2012 Tanaka .................. G06F 3/0412 250/208.2
2014/0160058 A1* 6/2014 Chen ..................... G06F 3/0412 345/174

FOREIGN PATENT DOCUMENTS

JP 2005-301373 A 10/2005
JP 2005-530217 A 10/2015

(Continued)

*Primary Examiner* — Nan-Ying Yang
(74) *Attorney, Agent, or Firm* — Seed IP Law Group LLP

(57) ABSTRACT

Disclosed is a display device having a plurality of gate lines, a plurality of pixels connected with the plurality of gate lines and an optical sensor connected with a k-th gate line among the plurality of gate lines. A gate pulse applied to the k-th gate line includes a sensing gate pulse applied during a (k−i)-th horizontal period and a pixel driving gate pulse applied during a k-th horizontal period. The optical sensor connected with the k-th gate line outputs a sensing voltage in response to the sensing gate pulse. The pixel connected with the k-th gate line is applied with a data voltage in response to the pixel driving gate pulse.

10 Claims, 8 Drawing Sheets

(56) References Cited

FOREIGN PATENT DOCUMENTS

| | | | |
|---|---|---|---|
| KR | 10-2007-0062143 | A | 6/2007 |
| KR | 10-2008-0000768 | A | 1/2008 |
| KR | 10-2009-0005452 | A | 1/2009 |
| KR | 10-1307548 | B1 | 9/2013 |
| TW | I406162 | B1 | 8/2013 |
| TW | I414987 | B | 11/2013 |

* cited by examiner

DISPLAY DEVICE HAVING OPTICAL SENSOR

This application claims the benefit of Korea Patent Application No. 10-2017-0087310 filed on Jul. 10, 2017, the entire contents of which is incorporated herein by reference for all purposes as if fully set forth herein

BACKGROUND

Technical Field

The present disclosure relates to a display device having an optical sensor.

Description of the Related Art

Liquid crystal display devices are used in more industrial fields due to its light, thin, and low power-consumption characteristics. The liquid crystal display devices are used for portable computers, such as laptops and PCs, office automation machines, audio/video devices, and outdoor/indoor advertisement display devices. A transmissive liquid crystal display device, which is the most common type of the liquid crystal display devices, displays an image by controlling an electric field applied to a liquid crystal layer to adjust light, which is incident from a backlight unit, according to a data voltage.

The display device having an optical sensor includes the optical sensor inside of a display panel, and controls an image based on a sensing result obtained by the optical sensor. However, it takes time to perform sensing processing and therefore an image reflecting the sensing result to be displayed on the display panel is delayed more than one frame.

BRIEF SUMMARY

Disclosed is a display device having a plurality of gate lines, a plurality of pixels connected with the plurality of gate lines and an optical sensor connected with a k-th gate line among the plurality of gate lines. A gate pulse applied to the k-th gate line includes a sensing gate pulse applied during a (k−i)-th horizontal period and a pixel driving gate pulse applied during a k-th horizontal period. The optical sensor connected with the k-th gate line outputs a sensing voltage in response to the sensing gate pulse. The pixel connected with the k-th gate line is applied with a data voltage in response to the pixel driving gate pulse.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. Detailed description of known arts will be omitted if it is determined that the arts can mislead the embodiments of the disclosure.

A liquid crystal mode of a liquid crystal display of the present disclosure may be implemented as a Twisted Nematic (TN) mode, a Vertical Alignment (VA) mode, an In Plane Switching (IPS) mode, a Fringe Field Switching (FFS) mode, etc. When divided by a transmittance to voltage characteristic, the liquid crystal display of the present disclosure may be implemented in a normally white mode or a normally black mode. The liquid crystal display of the present disclosure may be implemented in any kind of form, such as a transmissive liquid crystal display, a transflective liquid crystal display, a reflective liquid crystal display, etc.

In addition, embodiments of the present disclosure are described mainly about a liquid crystal display, but the technical idea of the present disclosure is not limited thereto. That is, the present disclosure can be applied to display devices having a structure in which pixels for image display and an optical sensor are connected to a gate line.

Figure 1:
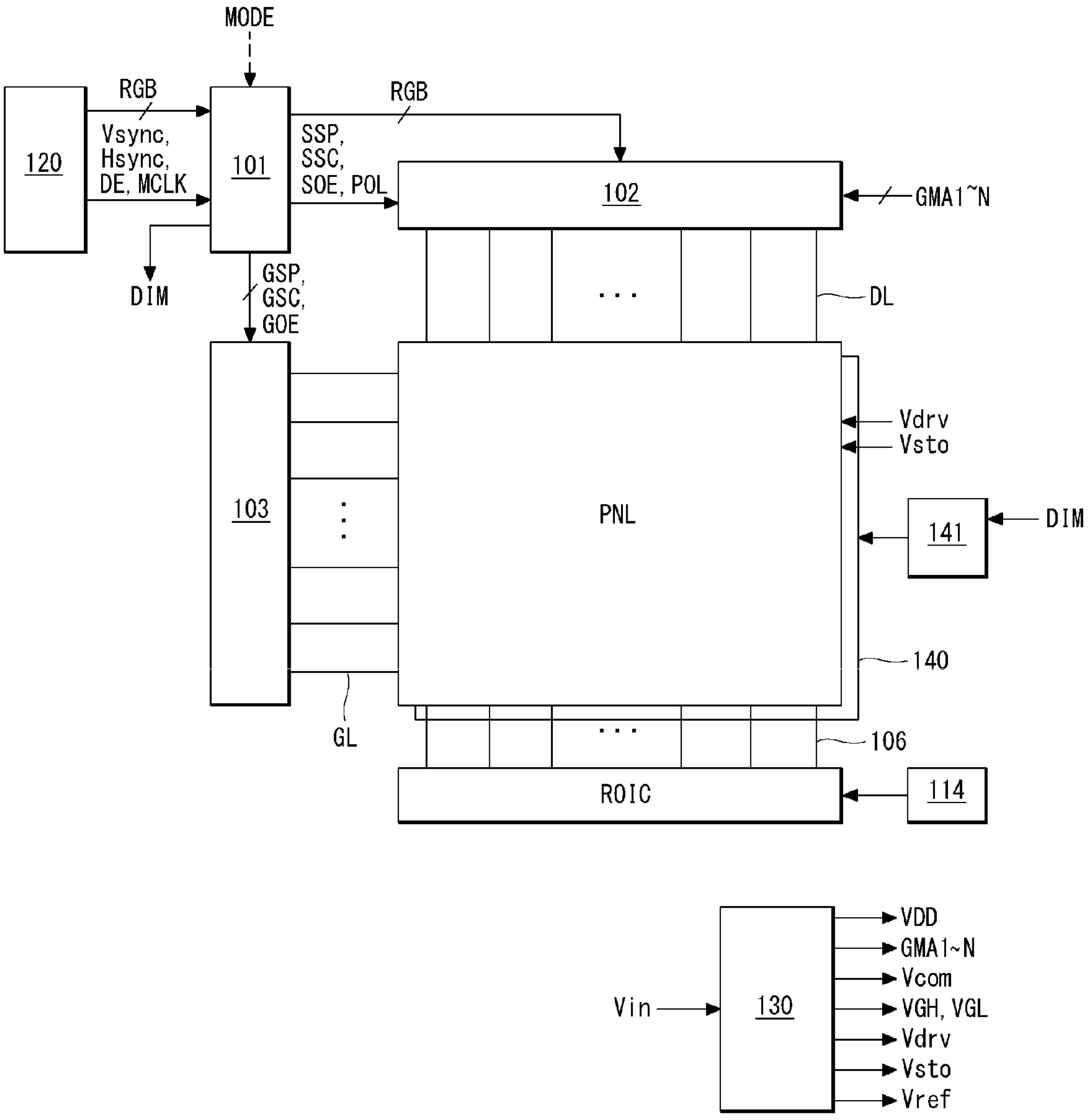
FIG. 1 is a diagram illustrating a display device having an optical sensor according to a present disclosure.
Figure 2:
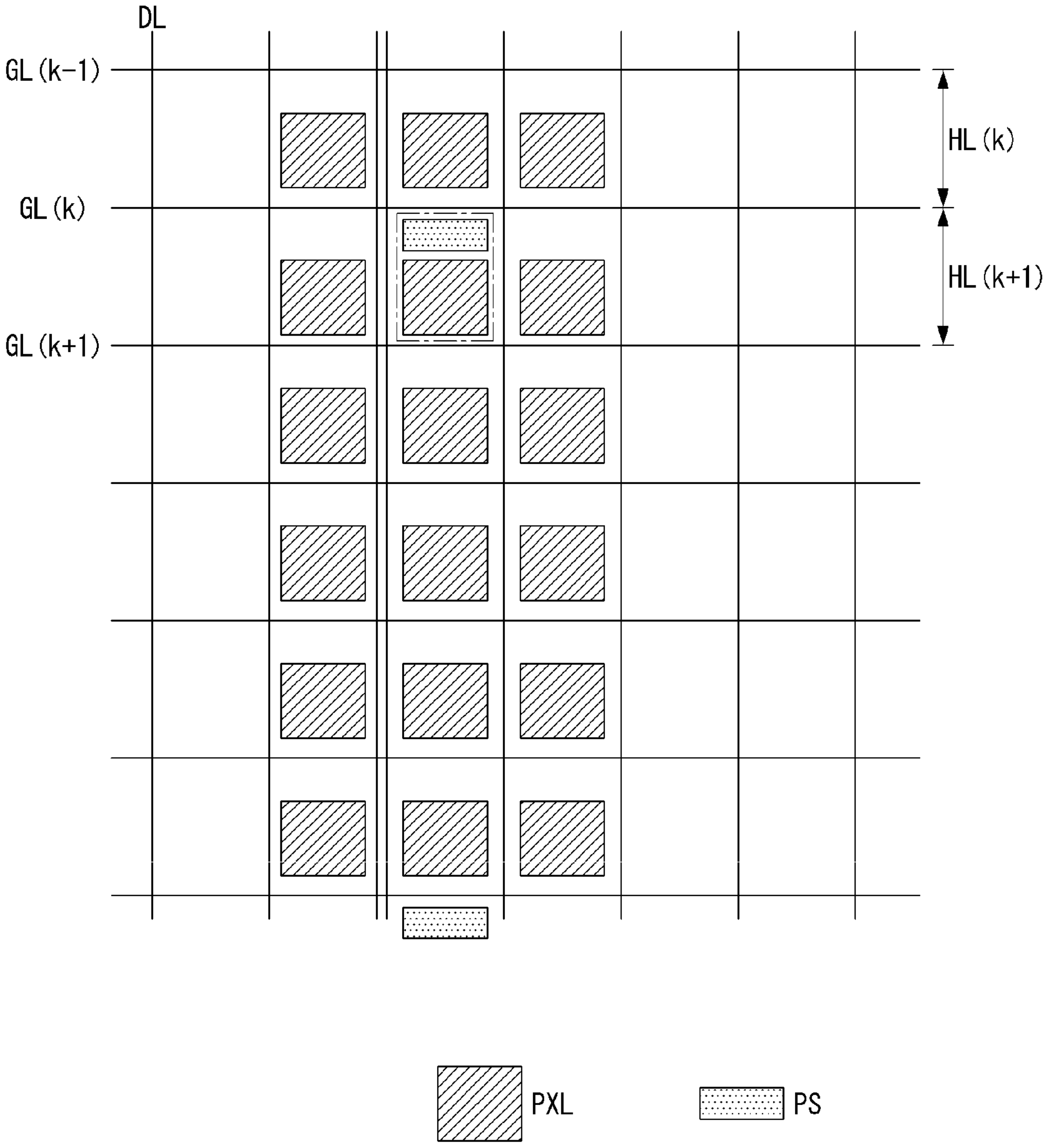
FIG. 2 is a diagram illustrating an array of a display panel shown in FIG. 1.

FIG. 1 is a diagram illustrating a display device having an optical sensor according to a present disclosure. FIG. 2 is a diagram illustrating an array of a display panel shown in FIG. 1.

Referring to FIGS. 1 and 2, the display device according to an embodiment of the present disclosure includes a display panel PNL, a timing controller 101, a display driver 102 and 103, an optical sensor driver ROIC, a power unit 130, a backlight unit 140, and a backlight driver 141.

The display panel PNL includes a plurality of pixels PXL and an optical sensor PS.

The pixels PXL are arranged along pixel lines HL(k) to HL(k+1]. Each of the pixels PXL is connected to a data line DL arranged along a column line and to a gate line GL arranged along a pixel line HL. That is, pixels PXL arranged in the same pixel line HL share the same gate line GL and are driven at the same time. In addition, a scan period in which data is written into pixels PXL connected to the same gate line GL may be defined as one horizontal period 1H. The optical sensors PS share the gate line GL with the pixels PXL. Detailed configuration of an optical sensor PS and each pixel PXL will be described later.

Using a timing signal from a host computer 120, the timing controller 101 generates timing control signals for controlling an operation timing of the display driver 102 and 103.

The timing control signals include a gate timing control signal for controlling an operation timing of a gate driver 103, and a data timing control signal for controlling an operation timing of a data driver 102 and polarity of a data voltage.

The gate timing control signal includes a gate start pulse GSP, a gate shift clock GSC, and a gate output enable signal GOE. The gate start pulse GSP is applied from the gate driver 103 to a first gate drive IC which first outputs a gate pulse in every frame period, and controls a shift start timing of the gate drive IC. The gate shift clock GSC is a clock signal that is input to gate drive ICs of the gate driver 103 to shift the gate start pulse. The gate output enable signal GOE controls an output timing of the gate drive ICs of the gate driver 103.

The data timing control signal includes a source start pulse SSP, a source sampling clock SSC, a polarity control signal POL, and a source output enable signal SOE. The source start pulse SSP is applied from the data driver 102 to a first source drive IC which first samples data, and controls a data sampling start timing. The source sampling clock SSC is a clock signal which controls a sampling timing within source drive ICs with reference to a rising or falling edge. The polarity control signal POL controls polarity of a data voltage output from the source drive ICs. The source output enable signal SOE controls output timings of the source drive ICs. When digital video data RGB is input to the data driver 102 through a mini Low Voltage Differential Signaling (LVDS) interface, the source start pulse SSP and the source sampling clock SSC may be omitted.

The display driver 102 and 103 drives the display panel PNL displaying video data in a display mode and an image scan mode. The display driver 102 and 103 includes the data driver 102 and the gate driver 103.

Under the control of the timing controller 101, the data driver 102 samples and latches digital video data RGB. The data driver 102 converts the digital video data RGB into a positive/negative polarity gamma reference voltage GMA1 to N to invert polarity of a data voltage. The positive/negative data voltage output from the data driver 102 is synchronized with a gate pulse output from the gate driver 103. Each source drive IC of the data driver 102 may be connected to data lines DL of the display panel PNL by a Chip On Glass (COG) process or a Tape Automated Bonding (TAB) process. The source drive ICs are densely positioned in the timing controller 101 to be implemented as one chip together with the timing controller 101.

If the display panel PNL is drive in a normally white mode, the data driver 102 outputs the minimum voltage under the control of the timing controller 101 so as to maximize a transmittance of the display panel PNL in the image scan mode. If the display panel PNL is drive in the normally black mode, the data driver 102 outputs the maximum voltage under the control of the timing controller 101 so as to maximize a transmittance of the display panel in the image scan mode.

Under the control of the timing controller 101, the gate driver 103 sequentially generates outputs of gate pulses (or scan pulses) in the display mode, and shifts a swing voltage of the output to a gate high voltage VGH and a gate low voltage VGL. A gate pulse output from the gate driver 103 is synchronized with a data voltage output from the data driver 102 and supplied to the gate lines GL sequentially. The gate high voltage VGH is a voltage higher than a threshold voltage of transistors T1 to T3 formed in a pixel array, and the gate low voltage VGL is a voltage lower than the threshold voltage of the transistors T1 to T3 formed in the pixel array. The gate drive ICs of the gate driver 103 may be connected to the gate lines GL of a lower substrate GLS2 of the display panel PNL by the TAB process, or may be formed directly on the lower substrate GLS2 of the display panel by a Gate In Panel (GIP) process along with the pixel array.

Through an interface such as an LVDS interface and a TMDS interface, the host computer 120 transmits, to the timing controller 101, digital video data RGB and timing signals Vsync, Hsync, DE, and MCLK required to drive the display mode.

The power unit 130 is implemented as a DC-DC converter that includes a pulse width modulation circuit PWM, a boost converter, a regulator, a charge pump, a voltage divider circuit, and an operation amplifier. The power unit 130 adjusts an input voltage Vin from the host computer 120 to generate power required to drive the crystal display panel PNL, the display driver 102 and 103, the optical sensor driver ROIC, the timing controller 101, and the backlight driver 141. Powers coming from the power unit 130 include a logic power voltage Vcc, a high-potential power voltage VDD, a gate high voltage VGH, a gate low voltage VGL, a common voltage Vcom, positive/negative gamma reference voltages GMA1~N, a storage reference voltage Vsto of an optical sensor, a driving voltage Vdrv of an optical sensor, and a reference voltage Vref of an optical sensor.

The backlight unit 140 is disposed below the display panel PNL. The backlight unit 140 includes a plurality of light sources, which are turned on and off by the backlight driver 141, to emit light toward the display panel PNL.

In the display mode, the backlight driver 141 turns on and off the light sources of the backlight unit 140 under the control of the timing controller 101 in response to a pulse width modulation signal of a dimming signal DIM which is changed depending on an input image. In the image scan mode, the backlight driver 141 turns on the light sources of the backlight unit 140 with the maximum brightness under the control of the timing controller 101.

The optical sensor driver ROIC generates sensing raw data based on a sensing voltage output from the optical sensor PS, converts the sensing raw data into a data format unit suitable for a communication protocol, and transmits the converted sensing raw data to the timing controller 101. The optical sensor driver ROIC samples an output voltage of the optical sensor PS supplied along a read-out line 106, amplifies the output voltage, and converts the amplified voltage into digital data to output sensing raw data.

Figure 3:
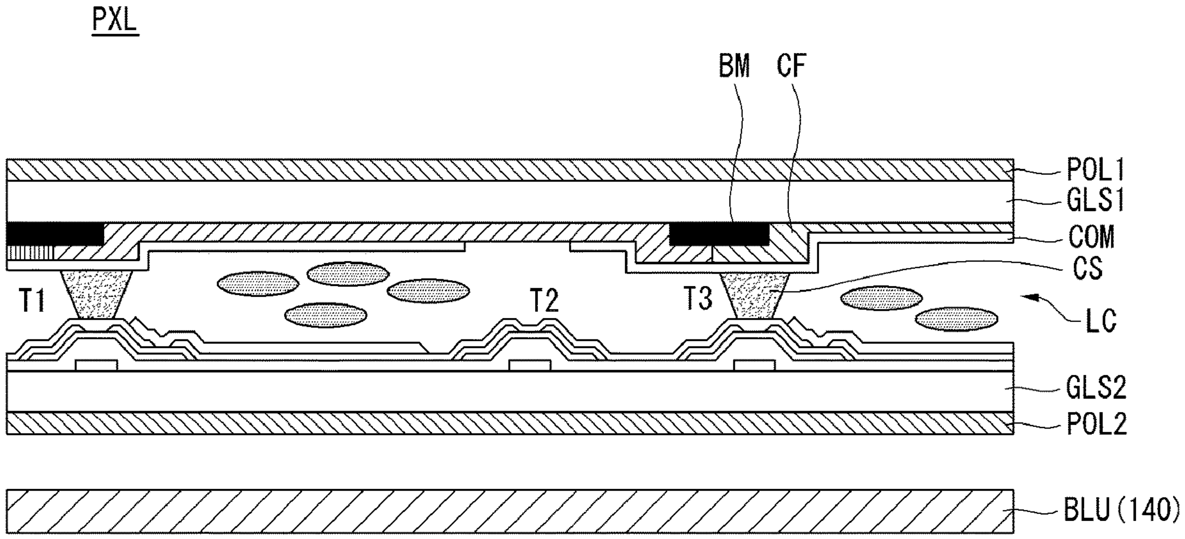
FIG. 3 is a diagram illustrating a cross section of a pixel.

FIG. 3 is a diagram illustrating a cross section of a pixel.

The display panel PNL includes an upper substrate GLS1 and a lower substrate GLS2. Between the upper substrate GLS1 and the lower substrate GLS2, there are formed a liquid crystal layer LC and a spacer CS for maintaining a cell gap of the liquid crystal layer LC. On the upper substrate GLS1, a color filter array including a color filter CF and a black matrix BM is formed. On the color filter array, a common electrode COM is formed. On the top surface of the upper substrate GLS1, an upper polarizing plate POL1 is attached. The lower substrate GLS2 includes a pixel array which includes data lines DL, gate lines GL, read-out lines 106, pixels PX, and optical sensors PS. The pixel array further includes sensor driving voltage supply lines for driving the optical sensors PS. On the button surface of the lower substrate GLS2, a lower polarizing plate POL2 is attached.

Figure 4:
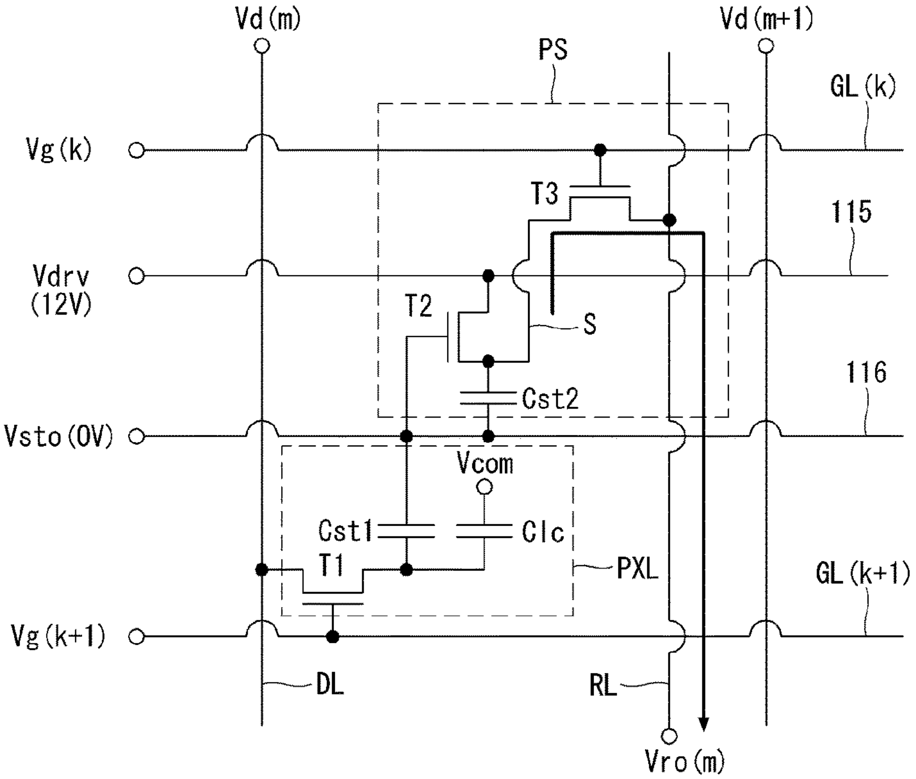
FIG. 4 is an equivalent circuit diagram illustrating a pixel and an optical sensor sharing the same gate line.

FIG. 4 is an equivalent circuit diagram illustrating a pixel and an optical sensor sharing the same gate line. In particular, FIG. 4 illustrates an optical sensor PS connected to the k-th gate line GL(k) (k is a natural number).

Referring to FIG. 4, each of the pixels PXL includes a pixel transistor T1, a liquid crystal cell Clc, and a first storage capacitor Cst1.

The pixel transistor T1 is turned on in response to a gate pulse Vg(k+1) from the (k+1)th gate line GL(k+1)GL to provide a data voltage Vd(m), supplied through the m-th data line DL (m is a positive integer), to a pixel electrode of the liquid crystal cell Clc. A gate electrode of the pixel transistor T1 is connected to the (k+1)-th gate line GL(k+1). A drain electrode of the pixel transistor T1 is connected to the m-th data line DL, and a source electrode of the pixel transistor T1 is connected to the pixel electrode of the liquid crystal cell Clc. The first storage capacitor Cst1 is charged with a differential voltage between a voltage of the pixel electrode and a voltage of the common electrode to thereby maintain a voltage of the liquid crystal cell Cls at a constant level.

The optical sensor PS includes a sensor transistor T2, a second storage capacitor Cst2, and a switch transistor T3.

The sensor transistor T2 converts light, which is emitted from the outside, into an optical current and stores the optical current in the second storage capacitor Cst2. A gate electrode of the sensor transistor T2 is connected to a storage reference voltage supply line 116. A storage reference voltage Vsto of 0V is supplied to the storage reference voltage supply line 116. A drain electrode of the sensor transistor T2 is connected to a sensor driving voltage supply line 115, and a source electrode of the sensor transistor T2 passes a node S and is connected to the second storage capacitor Cst2 and a drain electrode of the switch transistor T3. A sensor driving voltage Vdrv of 12V is supplied to the sensor driving voltage supply line 115.

The second storage capacitor Cst2 accumulates currents Is from the sensor transistor T2 to thereby being charged with a sensor output voltage. One side electrode of the second storage capacitor Cst2 passes the node S and is connected to the source electrode of the sensor transistor T2. The other side electrode of the second storage capacitor Cst2 is connected to the storage reference voltage supply line 116.

The switch transistor T3 is turned on in response to a gate pulse Vg(k) from the k-th gate line GL(k) to provide a voltage of the node S to the optical sensor driver ROIC through the read-out line RL. A gate electrode of the switch transistor T3 is connected to the k-th gate line GL(k). A drain electrode of the switch transistor T3 passes the node S and is connected to the second storage capacitor Cst2 and the source electrode of the sensor transistor T3. A source electrode of the switch transistor T3 is connected to the read-out line RL.

Figure 5:
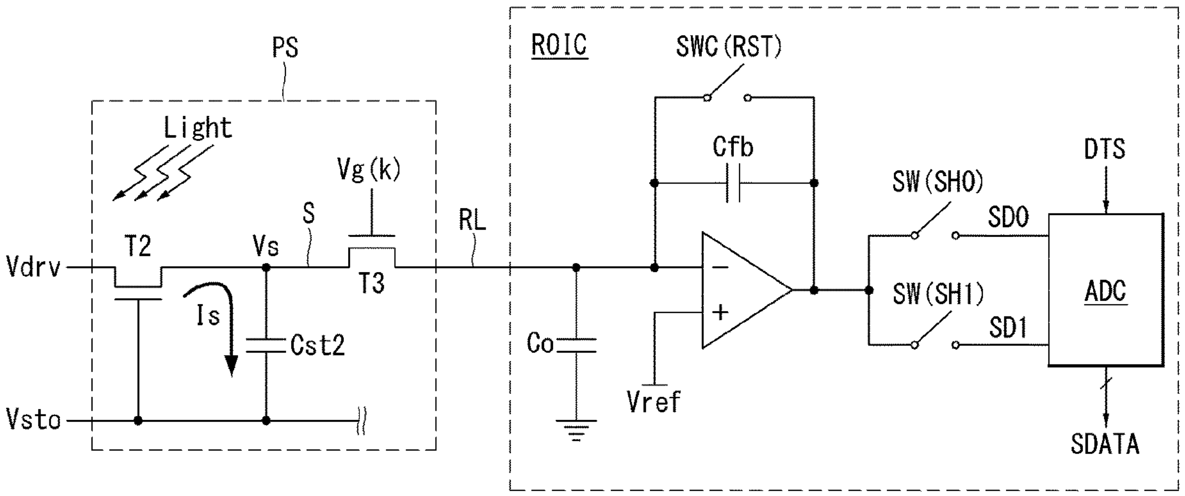
FIG. 5 is a circuit diagram illustrating an optical sensor and an optical sensor driver.
Figure 6:
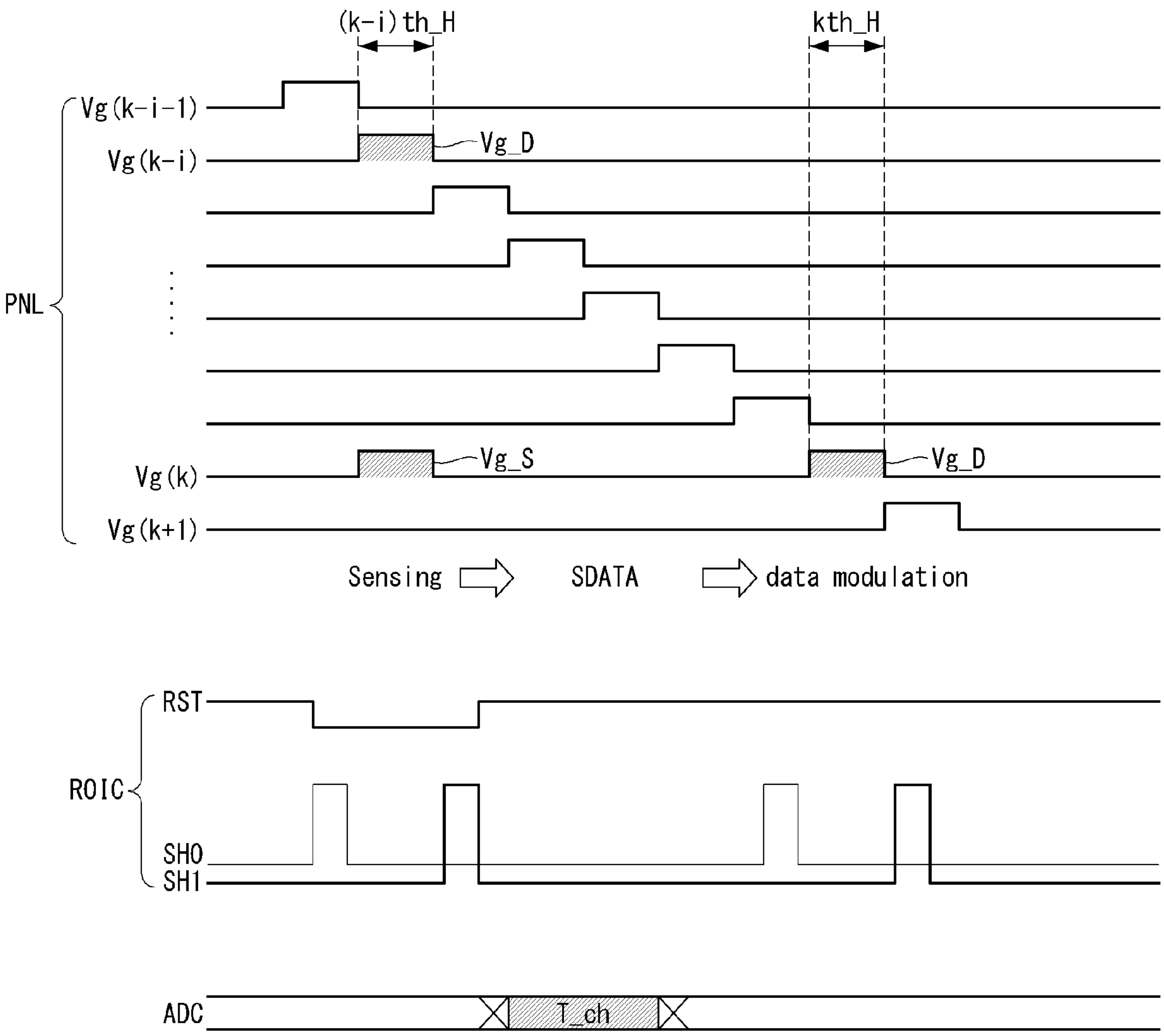
FIG. 6 is a diagram illustrating timings of a gate pulse and a sensor timing control signal according to a first embodiment of the present disclosure.

FIG. 5 is a circuit diagram illustrating an optical sensor and an optical sensor driver. FIG. 6 is a diagram illustrating timings of a gate pulse and a sensor timing control signal according to a first embodiment of the present disclosure. Hereinafter, as the same as in FIG. 4, the first embodiment is described mainly about operation of an optical sensor connected to the k-th gate line GL(k). That is, the following is description about how data applied to a pixel PXL connected to the k-th gate line GL(k) is changed based on light sensed by an optical sensor PS connected to the k-th gate line GL(k).

Referring to FIGS. 5 and 6, the optical sensor driver ROIC includes an operational amplifier, first and second sampling switches SW(SH0) and SW(SH1), and an analog-to-digital converter (ADC). Between an inverting input terminal and an output terminal of the operational amplifier, a reset switch element SWC(RST) and a feedback capacitor Cfb are connected. The inverting input terminal of the operational amplifier is connected to a capacitor Co and the source electrode of the switch transistor T3. The capacitor Co is connected between the inverting input terminal of the optical sensor driver ROIC and a base voltage source to remove a noise component of voltage which is received from the optical sensor PS. A reference voltage Vref of 2V is supplied to a non-inverting input terminal of the operational amplifier.

The k-th gate pulse Vg(k) applied to the k-th gate line GL(k) connected to the optical sensor PS becomes a turn-on voltage during the (k−i)th horizontal period (k−i)-th_H and the k-th horizontal period kth_H. Hereinafter, in the k-th gate pulse Vg(k), a turn-on voltage applied during the (k−i) horizontal period (k−i)th_H is referred to as a sensing gate pulse Vg_S, and a turn-on voltage applied during the k-th horizontal period kth_H is referred to a pixel driving gate pulse Vg_D.

Before the (k−i)th horizontal period (k−i)th_H, the first sampling switch SW(SH0) is turned on in response to a first switch control signal SHO, samples a reference voltage Vref stored in the feedback capacitor Cfb, and output a first sampling voltage SD0 to the ADC.

During the (k−i)-th horizontal period (k−i)th_H, the reset switch element SWC(RST) is turned on in response to a low-logic level reset signal RST and initializes a voltage of both ends of the feedback capacitor Cfb. When the first sampling switch SW(SH0) is turned off and the sensing gate pulse Vg_S applied to the k-th gate line GL(k) is supplied, the switch transistor T3 inputs a voltage of the node S into the optical sensor driver ROIC.

In response to a second switch control signal SH1 applied after the (k−i)-th horizontal period (k−i)th_H, the second sampling switch SW(SH1) is turned on, samples a sensing voltage stored in the feedback capacitor Cfb, and outputs a second sampling voltage SD1 to the analog-to-digital converter ADC. During a sensing processing period T_ch, the analog-to-digital converter ADC converts a differential voltage between the first sampling voltage SD0 and the second sampling voltage SD1 into sensing raw data SDATA, and outputs the sensing raw data SDATA to the timing controller 101 in response to a data transmission control signal DTS.

During the k-th horizontal period kth_H, pixels PXL located in the k-th pixel line HL(k) are scanned by the pixel driving gate pulse Vg_D. The data driver 102 is synchronized with the pixel driving gate pulse Vg_D to output a data voltage. As a result, the data voltage is written into the pixels PXL located in the k-th pixel line HL(k). At this point, a data voltage applied to pixels PXL which are adjacent to the optical sensor PS among the pixels PXL located in the k-th pixel line HL(k) is a data voltage modulated based on a sensing result obtained by the optical sensor PS.

As described above, when the optical sensor PS and the pixels PXL share the k-th gate line GL(k) in the first embodiment, the k-th gate pulse Vg(k) supplied to the k-th gate line GL(k) includes the sensing gate pulse Vg_S and the pixel driving gate pulse Vg_D. In addition, the optical sensor PS and the optical sensor driver ROIC are driven at a timing when the sensing gate pulse Vg_S is applied, and the pixels PXL are driven at a timing when the pixel driving gate pulse Vg_D is applied. Thus, it is possible to modulate data supplied to the pixels PXL, without any delay, based on a sensing result obtained by the optical sensor PS. Specifically, the output voltage to drive the LCD pixels in the same rows can be increased or decreased, pending on local, ambient light conditions as sensed by the optical sensor PS.

As can be seen in FIG. 2, ambient light sensors are positioned within the PNL itself and located adjacent to the pixels for which the sensed signal will be used. They can positioned every fifth column, every tenth column, or at some other interval. They can be positioned every sixth row, every tenth row, or some other interval. The locally positioned optical sensor PS acts as a local ambient light sensor for row it is in and for a set of adjacent rows. This permits rapid and dynamic change in the amount drive voltage provided to pixels in the row having the optical sensor and in immediately adjacent rows. If the optical sensor PS and pixels PXL sharing the same gate line with the optical sensor PS are driven at the same time, a sensing result obtained by the optical sensor PS cannot be reflected in pixels in which the corresponding optical sensor PS is located. It is because the sensing processing period T_ch of the optical sensor driver ROIC comes after the optical sensor PS performs a sensing operation and because the sensing processing period T_ch requires a specific time. Thus, if the optical sensor PS and pixels PXL sharing the same gate line GL with the optical sensor PS are driven at the same time, a data voltage changed based on a sensing result obtained by the optical sensor PS is delayed by at least one frame and then supplied to the pixels PXL.

On contrary, the first embodiment of the present disclosure is implemented in a manner in which the optical sensor PS is driven before the pixels PXL and therefore it is possible to quickly apply a data voltage, which has reflected a sensing result obtained by the optical sensor PS, in the pixels PXL.

An interval between the sensing gate pulse Vg_S and the pixel driving gate pulse Vg_D is desirably equal to or greater than the sensing processing period T_ch. The sensing processing period T_ch may be different depending on the number of column lines in which the optical sensor PS is arranged.

Figure 7:
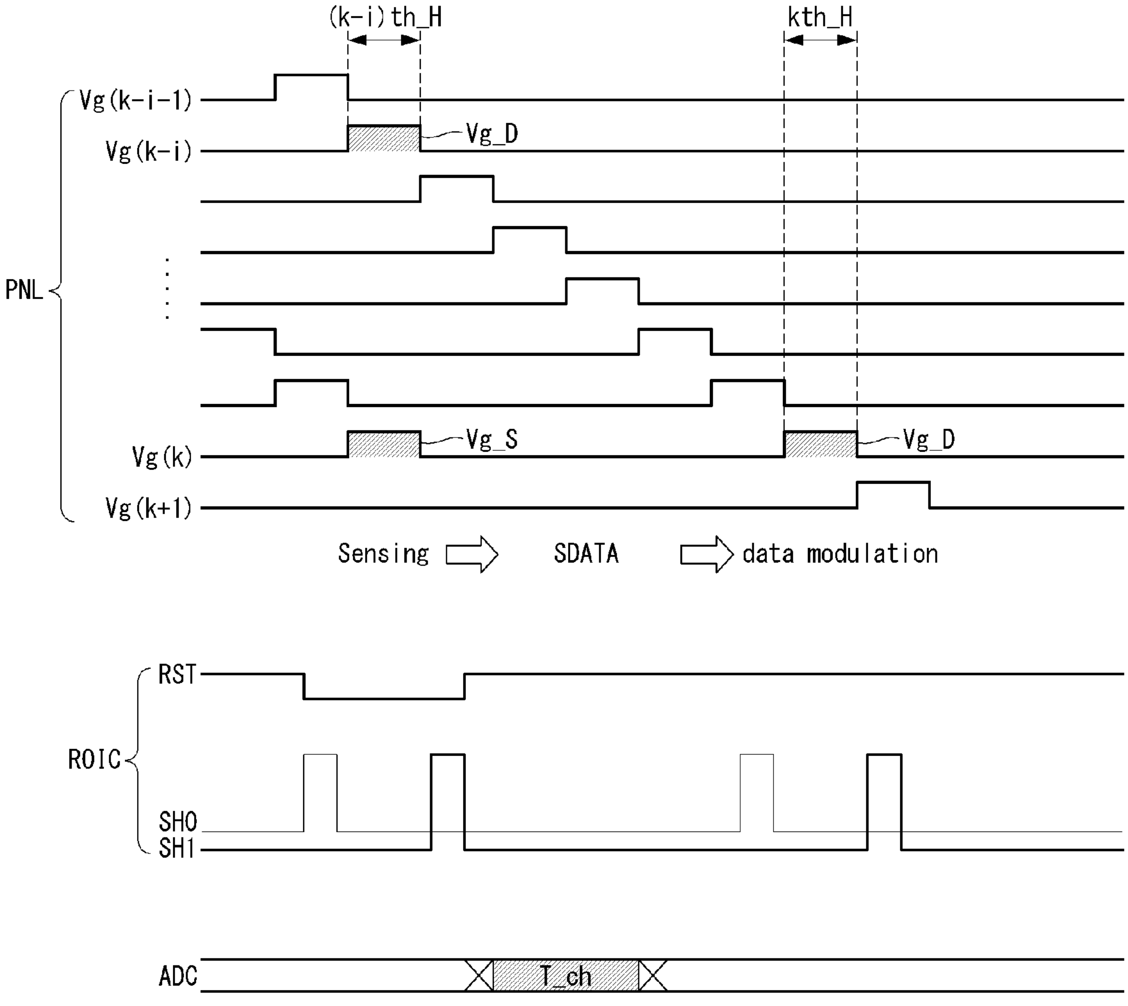
FIG. 7 is a diagram illustrating timings of a gate pulse and a sensor timing control signal according to a second embodiment of the present disclosure.

FIG. 7 is a diagram illustrating timings of a gate pulse and a sensor timing control signal according to a second embodiment of the present disclosure. In the second embodiment, like reference numerals refer to substantially identical elements in the first embodiment and detailed description thereof are herein omitted.

In the first embodiment, only the k-th gate pulse Vg(k) applied to the k-th gate line GL(k) shared by the optical sensor PS and the pixels PXL is applied as a turn-on voltage twice within one frame.

On contrary, in the second embodiment, every gate pulse applied to every gate line GL becomes a turn-on voltage twice within one frame. That is, as the gate driver 103 supplies the same gate pulse to every gate line GL, it is possible to simplify the gate driver 103.

In the second embodiment, the k-th gate pulse Vg(k) applied to the k-th gate line GL(k) shared by the optical sensor PS and the pixels PXL is the same as that of the first embodiment, and, as a result, a driving method of the second embodiment is the same as that of the first embodiment.

Figure 8:
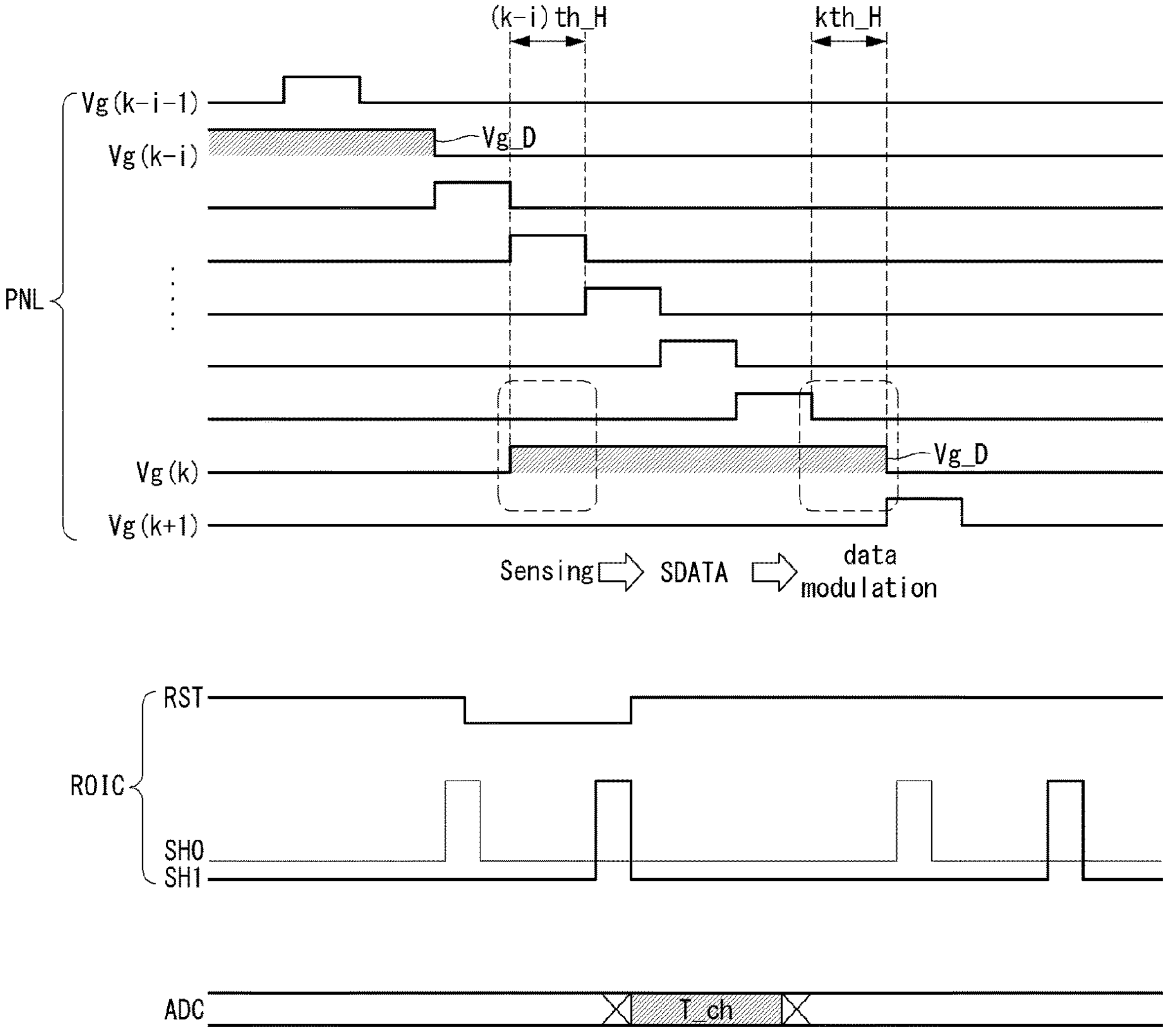
FIG. 8 is a diagram illustrating timings of a gate pulse and a sensor timing control signal according to a third embodiment of the present disclosure.

FIG. 8 is a diagram illustrating timings of a gate pulse and a sensor timing control signal according to a third embodiment of the present disclosure. In the third embodiment, like reference numerals refer to substantially identical elements in the above embodiments and the detailed description thereof are herein omitted.

In the third embodiment, the k-th gate pulse Vg(k) applied to the k-th gate line GL(k) shared by the optical sensor PS and the pixels PXL is maintained as a turn-on voltage from the (k−i)-th horizontal period (k−i)th_H to the k-th horizontal period kth_H. That is, the k-th gate pulse Vg(k) applied to the k-th gate line GL(k) is maintained as a turn-on voltage during a period of "(i+1)H".

In the third embodiment, the optical sensor PS connected to the k-th gate line GL(k) performs a sensing operation during the (k−i)-th horizontal period (k−i)th_H, and the pixels PXL are driven during the k-th horizontal period kth_H. As such, the optical sensor PS is driven by applying a gate pulse in advance before the k-th horizontal period kth_H in which the pixels PXL are driven, it is possible to modulate a data voltage, which is applied to the pixels PXL, based on a sensing result obtained by the optical sensor PS within one frame.

Figure 9:
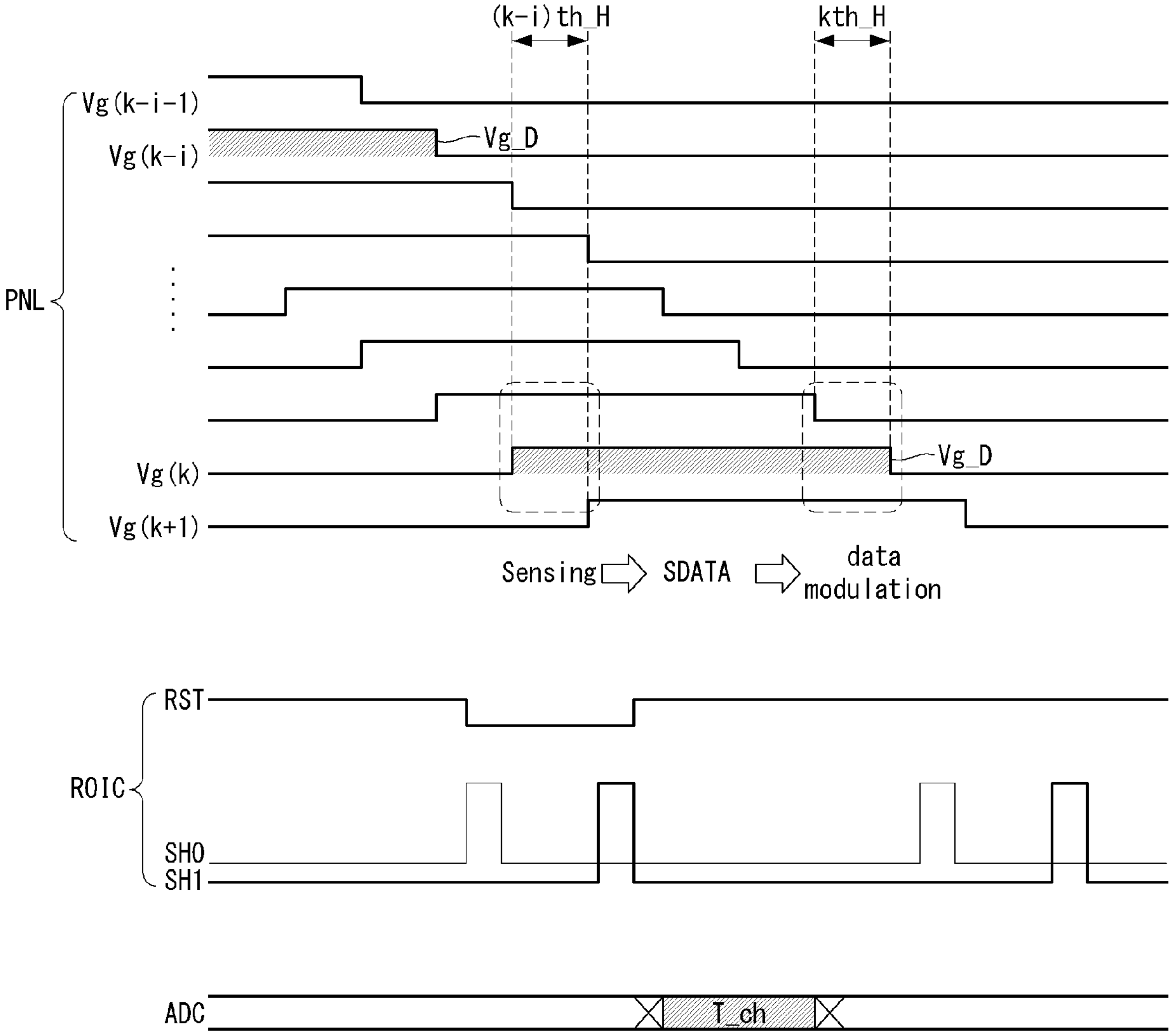
FIG. 9 is a diagram illustrating timings of a gate pulse and a sensor timing control signal according to a fourth embodiment of the present disclosure.

FIG. 9 is a diagram illustrating timings of a gate pulse and a sensor timing control signal according to a fourth embodiment of the present disclosure. In the fourth embodiment, like reference numerals refer to substantially identical elements in the above embodiments and the detailed description thereof are herein omitted.

In the fourth embodiment, the k-th gate pulse Vg(k) applied to the k-th gate line GL(k) shared by the optical sensor PS and the pixels PXL is maintained as a turn-on voltage from the (k−i)-th horizontal period (k−i)th_H to the k-th horizontal period kth_H. That is, the k-th gate pulse Vg(k) applied to the k-th gate line GL(k) is maintained as a turn-on voltage during a period (i+1)H. In addition, in the fourth embodiment, the gate pulse Vg applied to every gate line GL is maintained as a turn-on voltage during the period (i+1)H. Accordingly, the gate driver 103 according to the fourth embodiment may be simplified more than the gate driver 103 according to the third embodiment.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device, comprising:

a plurality of gate lines;

a plurality of pixels connected to respective ones of the plurality of gate lines; and an optical sensor connected to a k-th gate line among the plurality of gate lines;

wherein a gate pulse sequence applied to the k-th gate line includes an optical sensing gate pulse applied during a (k−i)-th horizontal period and a pixel driving gate pulse synchronized with a data voltage applied during a k-th horizontal period, wherein the optical sensor connected with the k-th gate line outputs a sensing voltage in response to the optical sensing gate pulse, and wherein the pixel connected with the k-th gate line is applied with a data voltage in response to the pixel driving gate pulse that is modulated based on an output from the optical sensor.

2. The display device of claim 1, wherein the gate pulse applied to the k-th gate line is maintained as a turn-on voltage from the (k−i)th horizontal period to the k-th horizontal period.

3. The display device of claim 1, wherein each of the plurality of gate lines is applied with a same gate pulse.

4. The display device of claim 1, further comprising:

an optical sensor driver generating a sensing raw data based on the sensing voltage outputted from the optical sensor.

5. The display device of claim 4, wherein a sensing processing period in which the optical sensor driver generates the sensing raw data based on the sensing voltage outputted from the optical sensor is equal to or less than an interval between the sensing gate pulse and the pixel driving gate pulse.

6. The display device of claim 5, wherein the pixel connected with the k-th gate line is applied with a data voltage modulated based on the sensing raw data during the k-th horizontal period.

7. The display device of claim 5, wherein the optical sensor driver comprises:

a first sampling switch turned on before the (k−i)th horizontal period to sample a reference voltage and output a first sampling voltage;

a second sampling switch turned on after the (k−i)th horizontal period to sample the sensing voltage and output a second sampling voltage; and an analog-to-digital converter connected to the first and second sampling switches, and converting a differential voltage between the first sampling voltage and the second sampling voltage to the sensing raw data during the sensing processing period.

8. The display device of claim 4, wherein the optical sensor comprises:

a sensor transistor converting light emitted from outside into an optical current;

a storage capacitor connected with the sensor transistor to store the optical current from the sensor transistor as the sensing voltage; and a switch transistor turned on in response to the sensing gate pulse from the k-th gate line to supply the sensing voltage stored in the storage capacitor to the optical sensor driver.

9. A display device, comprising;

a plurality of gate lines; and a pixel and an optical sensor sharing a same gate line among the plurality of gate lines, wherein, after the optical sensor outputs a sensing voltage generated based on ambient light present at the outside of the display device, the pixel sharing the gate line with the optical sensor is applied with a data voltage that is modulated based on the sensing voltage, wherein a gate pulse applied to the gate line shared by the pixel and the optical sensor includes a sensing gate pulse for controlling the optical sensor to output the sensing voltage and a pixel driving gate pulse for driving the pixel, and wherein the pixel driving gate pulse is output after the sensing gate pulse within one frame, and wherein the gate pulse applied to the gate line shared by the pixel and the optical sensor is maintained as a turn-on voltage during an interval between the sensing gate pulse and the pixel driving gate pulse.

10. The display device of claim 9, wherein each of the plurality of gate lines is applied with a same gate pulse.

* * * * *